(12) United States Patent
Wagner et al.

(10) Patent No.: US 10,514,101 B2
(45) Date of Patent: Dec. 24, 2019

(54) LOW LOAD SEAL WITH OUTER DIAMETER FLAP

(71) Applicant: Freudenberg-NOK General Partnership, Plymouth, MI (US)

(72) Inventors: John B. Wagner, Greenfield, IN (US); Brian K. Fella, Centergrove, IN (US)

(73) Assignee: Freudenberg—NOK General Partnership, Plymouth, MI (US)

( * ) Notice: Subject to any disclaimer, the term of this patent is extended or adjusted under 35 U.S.C. 154(b) by 76 days.

(21) Appl. No.: 15/877,461

(22) Filed: Jan. 23, 2018

(65) Prior Publication Data

US 2018/0142789 A1 May 24, 2018

Related U.S. Application Data

(62) Division of application No. 13/475,476, filed on May 18, 2012, now abandoned.

(51) Int. Cl.
*F16J 15/3276* (2016.01)
*F16J 15/3224* (2016.01)
*F16J 15/3252* (2016.01)
*F16J 15/3268* (2016.01)

(52) U.S. Cl.
CPC ....... *F16J 15/3276* (2013.01); *F16J 15/3224* (2013.01); *F16J 15/3252* (2013.01); *F16J 15/3268* (2013.01)

(58) Field of Classification Search
CPC .. F16J 15/3208; F16J 15/3212; F16J 15/3232; F16J 15/3248; F16J 15/3252; F16J 15/3268; F16J 15/3276
See application file for complete search history.

(56) References Cited

U.S. PATENT DOCUMENTS

| 2,834,616 | A | 5/1958 | Stephens |
| RE24,940 | E | 2/1961 | Stephens |
| 4,147,367 | A | 4/1979 | Smith et al. |
| 4,274,641 | A | 6/1981 | Cather, Jr. |
| 4,448,461 | A | 5/1984 | Otto |

(Continued)

FOREIGN PATENT DOCUMENTS

| CN | 1993577 A | 7/2007 |
| JP | 2008255979 A | 10/2008 |

(Continued)

OTHER PUBLICATIONS

Chinese Office Action dated Feb. 19, 2019 with English translation (corresponding to CN 201710885354.2).

*Primary Examiner* — Nicholas L Foster
(74) *Attorney, Agent, or Firm* — Daniel J. Sepanik, Esq.; Harness, Dickey & Pierce, P.L.C.

(57) ABSTRACT

A seal for insertion in a bore in an outer member and engaging an inner member received in the bore. The seal includes an annular insert having an elastomeric body over-molded on the annular insert and an inner seal extending radially inward from the annular insert. The inner seal including an inboard sealing surface and the elastomeric body over-molded on the annular insert defining an outer portion including an outboard sealing surface including an annular flap on an exterior side of the annular insert that, in an installed position, is adapted to be compressed between the outer annular insert and the outer member.

3 Claims, 2 Drawing Sheets

(56) References Cited

U.S. PATENT DOCUMENTS

| | | | |
|---|---|---|---|
| 5,711,616 A | 1/1998 | Gassmann et al. | |
| 5,979,904 A | 11/1999 | Balsells | |
| 6,053,502 A | 4/2000 | Hallenstvedt | |
| 6,702,293 B2 | 3/2004 | Endo et al. | |
| 7,798,497 B2 | 9/2010 | Wagner et al. | |
| 8,002,287 B2 | 8/2011 | Wagner | |
| 8,210,543 B2 * | 7/2012 | Erl | F16F 13/1454 |
| | | | 277/585 |
| 8,424,398 B2 | 4/2013 | Wagner et al. | |
| 2002/0130472 A1 | 9/2002 | Endo et al. | |
| 2005/0173869 A1 | 8/2005 | Wagner | |
| 2008/0012234 A1 | 1/2008 | Wagner | |
| 2008/0019624 A1 | 1/2008 | Kubo | |
| 2008/0036159 A1 | 2/2008 | Yanagi | |
| 2008/0284110 A1 | 11/2008 | Dahlheimer | |
| 2011/0049815 A1 | 3/2011 | Wagner | |

FOREIGN PATENT DOCUMENTS

| | | |
|---|---|---|
| WO | 94/08159 A1 | 4/1994 |
| WO | 2012049867 A1 | 4/2012 |

\* cited by examiner

LOW LOAD SEAL WITH OUTER DIAMETER FLAP

CROSS-REFERENCE TO RELATED APPLICATIONS

This application is a divisional of U.S. patent application Ser. No. 13/475476, filed on May 18, 2012. The entire disclosure of the above application is incorporated herein by reference.

FIELD

The present disclosure relates to seals and more particularly, to a low load seal with an outer diameter flap.

BACKGROUND

This section provides background information related to the present disclosure which is not necessarily prior art.

Seals are commonly used for sealing a gap disposed around an outer surface of an inner member received within a bore of an outer member, such as a fuel injector, a spark plug tube or a shaft. Conventional seals incorporate a rubber outer dimension (OD) for engaging a bore and may have various inner dimension (ID) seal configurations for engaging a shaft or other inner member.

SUMMARY

This section provides a general summary of the disclosure, and is not a comprehensive disclosure of its full scope or all of its features.

A seal for insertion in a bore in an outer member and engaging an inner member received in the bore. The seal includes an annular insert having an elastomeric body over-molded on the annular insert and an inner seal extending radially inward from the annular insert. The inner seal including an inboard sealing surface and the elastomeric body over-molded on the annular insert defining an outer portion including an outboard sealing surface including an annular flap on an exterior side of the annular insert that, in an installed position, is adapted to be compressed between the outer annular insert and the outer member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
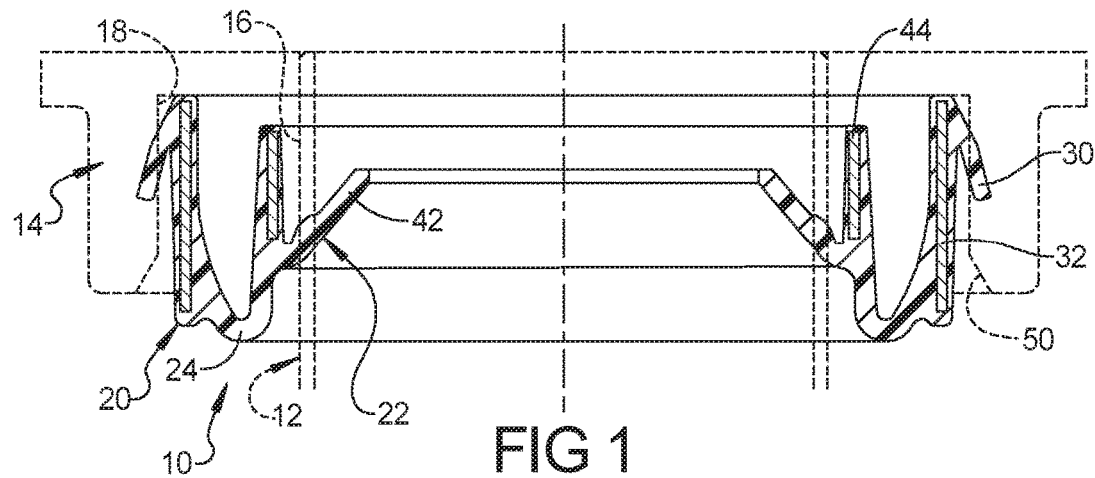
FIG. 1 is a cross-sectional view of a low load dual insert seal according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
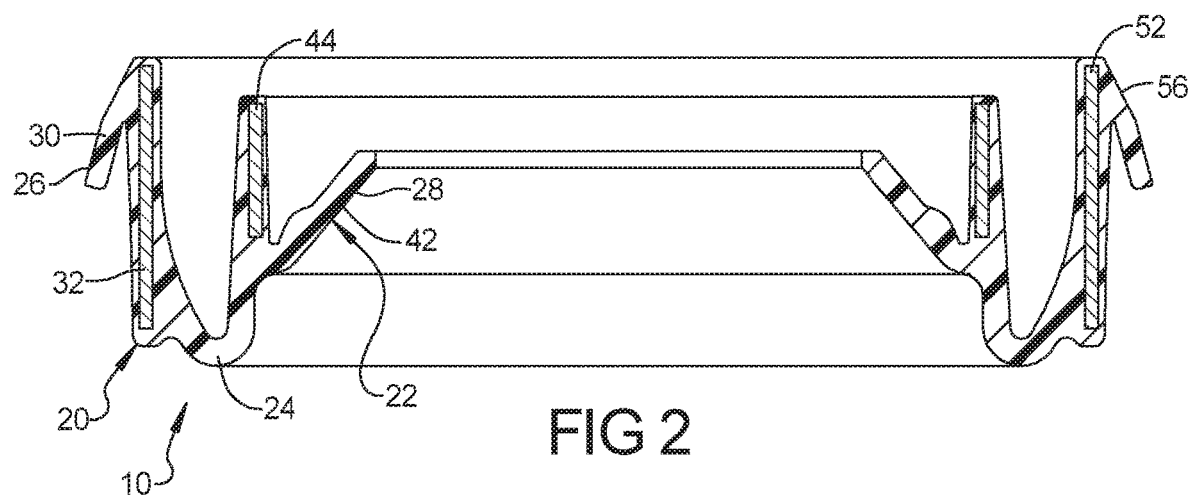
FIG. 2 is an enlarged cross-sectional view of the seal of FIG. 1.

With reference to FIGS. 1 and 2, an arrangement for sealing an annular space is shown. The arrangement generally includes a seal 10 disposed in an annular space defined between an inner member 12 and an outer member 14. During operation, the seal 10 engages respective inner and outer sealing surfaces 16 and 18 on the inner and outer members 12, 14, respectively, in an assembled position.

For purposes of discussion, the inner member 12 can be a shaft, while the outer member 14 can be a bore. It is appreciated that while the specific examples provided herein relate to a shaft and bore arrangement, the teachings may be similarly applicable to other sealing arrangements and are not limited to a shaft and bore arrangement, as described herein.

With specific reference now to FIG. 2, the seal 10 includes an outer portion 20, an inner seal 22 and an intermediate web 24 extending between the outer portion 20 and the inner seal 22. The outer portion 20 is radially offset outwardly relative to the inner seal 22. The outer portion 20 defines an outboard sealing surface 26 for engaging the sealing surface 18 of the bore 14 in an installed position. Similarly, the inner seal 22 defines an inboard sealing surface 28 for engaging the sealing surface 16 of the shaft or other member 12 in an installed position. The outboard and inboard sealing surfaces 26 and 28 of the seal 10 may be made of an elastomeric material such as rubber, although other materials may be used. The outboard sealing surface 26 of the seal 10 can include an annular flap 30 that in an uninstalled condition can extend at an angle in an overlapping relationship relative to an annular insert 32 that is overmolded within the outer portion 20. As mentioned, the annular flap 30 in an un-installed condition, extends at an angle relative to the outer annular insert 32, and in an installed position is adapted to be compressed between the outer annular insert 32 and the sealing surface 18 of the outer member 14.

The inboard sealing surface 28 of the seal 10 can be disposed on an annular flap 42 of the inner seal which can extend at an angle relative to an inner annular insert 44 in an un-installed condition and in an installed condition is adapted to be compressed between the inner annular insert 44 and the inner member 12.

The web portion 24 is adapted to flex to accommodate the inner seal 22 being radially offset relative to the outer portion 20 so that the inner seal 22 can maintain contact with the inner member 12 upon movement of the inner member 12 relative to the outer member 14. It is noted that the outer annular flap 30 is designed to have an interference fit within the inner surface within the bore 14 and that the inner annular flap 42 has an interference fit with the outer surface of the inner member 12. The annular flaps 30, 42 allow for reduction in the rubber stress as compared to a solid rubber bead, and allows the inner seal 22 and outer portion 20 to follow the shaft under a thermal cycle from hot to cold and vice versa, and due to other movement, such as vibration and part-to-part shift. This provides improved shaft followability as compared to prior designs. The outer flap 30 allows the design to be made with looser tolerance and less structure to counter extreme forces from rubber containment. This provides more design freedom in controlling force and improving design longevity due to thermal variation and component movement.

As shown in FIG. 1, the bore engagement surface 18 can include a tapered surface 50 at the entryway for insertion of the seal 10 therein. Furthermore, on the inboard end 52 of the seal 10, the surface of the outer portion 20 can be provided with an outwardly extending taper 56 that transitions into the flap 30 which can be disposed angularly relative to the insert 34 in the un-installed position, as shown. It should be understood in the installed position, the flap 30 would be compressed between the outer annular insert 34 and the inner surface 18 of the outer member 14.

Figure 3:
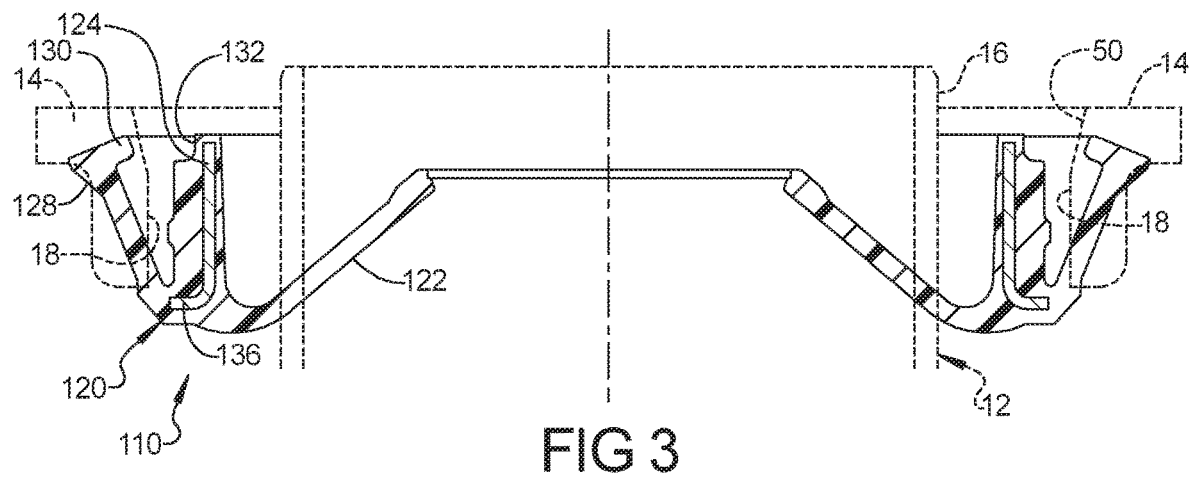
FIG. 3 is a cross-sectional view of a low load single insert seal according to the principles of the present disclosure.

With reference to FIG. 3, a seal 110 having an alternative design will now be described. The seal 110 includes an outer portion 120 and an inner seal 122 that extends radially inward from the outer portion 120. The outer portion 120 includes an insert ring 124 that is overmolded by elastomeric material 126 and an annular flap 128 can extend from one end of the insert 124 in an angled direction therefrom in an un-installed position and in an installed position can be compressed between the insert ring 124 and an inner surface 18 of an outer member 14. The annular flap 128 can include a projecting flap retention feature 130 on an inner surface thereof at a distal end of the annular flap 128. The outer portion of the elastomeric body overmolded on the insert ring 124 can include a corresponding recess 132 for receiving the projecting flap retention feature 130 of the flap 128. The insert ring 124 can be provided as a cylindrical body, and can include a radially extending flange portion 136 that reinforces the junction between the overmolded insert ring 124 and the annular flap 128.

The inner seal 122 can have a generally conical shape in its un-installed position, and can have an interference fit with the outer surface 16 of the inner member 12 in its installed position. The inner seal 122 would be deformed to engage the inner member 12 with generally cylindrical contact with the surface 16. The outer annular flap 128 can be provided with radially outwardly extending increased thickness regions at its distal end that provide additional loading on the annular flap in its assembled condition that generally correspond to the tapered region 50 of the interior surface 18 of the bore in the outer member. In the installed position, the increased thickness region 140 at the distal end of the annular flap 128 causes the distal portion to maintain compression in the tapered region 50 of the interior surface of the outer member 14.

Figure 4:
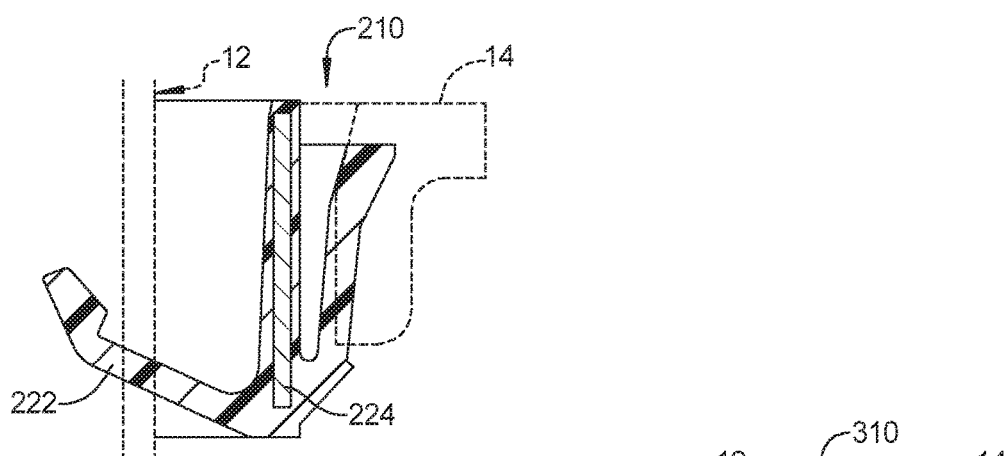
FIG. 4 is a cross-sectional view of a second embodiment of a low load single insert offset seal.
Figure 5:
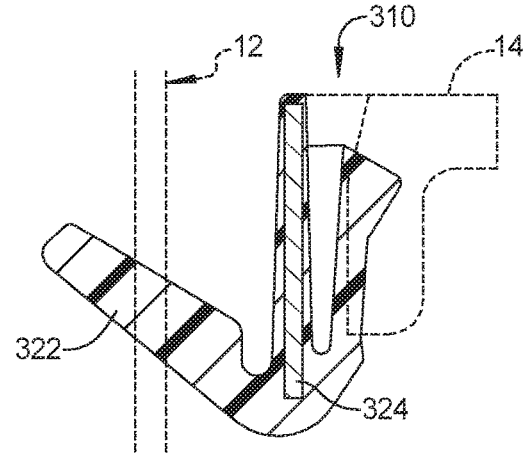
FIG. 5 is a cross-sectional view of a third embodiment of a low load single insert offset seal.

FIGS. 4 and 5 provide alternative seal designs 210, 310 wherein the seals are illustrated in their un-installed state, and thereby showing the overlapping portions providing the interference with the outer member 14 and inner member 12. FIGS. 4 and 5 illustrate the insert 224, 324 being modified as compared to the insert ring 124 by not having an annular flange on one end thereof. Furthermore, the cross-sectional shapes of the inner seals 222 and 322 are shown having different shapes as compared to the seal 122 shown in FIG. 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal assembly, comprising:
a first member having an outer surface;
a second member defining a bore for receiving the first member;
an annular insert having a first axial end and a second axial end; and
an elastomeric body including a first portion over-molded on said annular insert and an inner seal extending radially inward from said first portion at the first axial end on an interior side of said annular insert, said inner seal including an inboard sealing surface engaging the outer surface of the first member, said first portion including an outboard sealing surface including an annular flap extending from the first axial end on an exterior side of said annular insert toward the second axial end of said annular insert, which in an un-installed condition, extends in an overlapping relationship relative to said annular insert, and in an installed position, a gap is defined between the bore of the second member and the elastomeric body over-molded on the annular insert wherein the gap is smaller than a radial thickness of the annular flap so that the annular flap is in direct contact with the elastomeric body over-molded on said annular insert and the second member so as to be compressed between said annular insert and the second member so that the annular insert and the second member both apply compression forces against the annular flap, and a distal end of said annular flap including a region of increased thickness that is directly between the annular insert and the second member.

2. The seal according to claim 1, wherein said annular flap includes a hinge portion located at an end portion of said annular insert.

3. The seal according to claim 1, wherein said annular insert includes a radially outwardly extending flange portion at the first axial end.

* * * * *